United States Patent [19]

George

[11] Patent Number: 5,122,565
[45] Date of Patent: Jun. 16, 1992

[54] STABILIZED POLYKETONE POLYMERS CONTAINING A MIXTURE OF A HYDROXYAPATITE AND AN ALUMINA HYDROGEL

[75] Inventor: Eric R. George, Houston, Tex.

[73] Assignee: Shell Oil Company, Houston, Tex.

[21] Appl. No.: 603,490

[22] Filed: Oct. 26, 1990

[51] Int. Cl.$^5$ .................................................. C08K 3/32
[52] U.S. Cl. .................................... 524/417; 524/430; 524/436; 524/437
[58] Field of Search ............... 524/430, 437, 436, 417, 524/706

[56] References Cited

U.S. PATENT DOCUMENTS

| | | | |
|---|---|---|---|
| 2,493,597 | 1/1950 | Rothrock et al. ................... 260/45.7 |
| 2,495,286 | 1/1950 | Brubaker .............................. 260/63 |
| 3,124,418 | 3/1964 | Malley et al. ......................... 23/143 |
| 3,520,654 | 7/1970 | Malley et al. ......................... 23/143 |
| 3,694,412 | 9/1972 | Nozaki ................................. 260/63 |
| 3,948,850 | 4/1976 | Hudgin ............................... 260/45.7 |
| 4,154,812 | 5/1979 | Sanchez et al. ...................... 423/626 |
| 4,594,382 | 6/1986 | Hoenig et al. ....................... 524/405 |
| 4,746,686 | 5/1988 | Waller ................................... 522/14 |
| 4,761,448 | 8/1988 | Kluttz et al. ......................... 524/381 |
| 4,843,144 | 6/1989 | Van Broekhoven et al. ........ 528/612 |
| 4,851,470 | 7/1989 | George ................................. 524/612 |
| 4,880,903 | 11/1989 | Van Broekhoven et al. ........ 528/392 |
| 4,937,279 | 6/1990 | Betso et al. .......................... 524/417 |
| 5,021,496 | 6/1991 | Machado et al. .................... 524/414 |

FOREIGN PATENT DOCUMENTS 57-109848  3/1982  Japan.
1081304  4/1967  United Kingdom.

*Primary Examiner*—Paul R. Michl
*Assistant Examiner*—Tae H. Yoon

[57] ABSTRACT

Polymer compositions comprising an intimate mixture of a linear alternating polymer of carbon monoxide and at least one ethylenically unsaturated hydrocarbon and a mixture of a hydroxyapatite and an alumina hydrogel or aluminum-containing decomposition product thereof demonstrate improved stability.

20 Claims, No Drawings

STABILIZED POLYKETONE POLYMERS CONTAINING A MIXTURE OF A HYDROXYAPATITE AND AN ALUMINA HYDROGEL

FIELD OF THE INVENTION

This invention relates to polyketone polymers, and, more particularly, to compositions of a polyketone polymer stabilized with a mixture of a hydroxyapatite and an alumina hydrogel.

BACKGROUND OF THE INVENTION

The class of polymers of carbon monoxide and olefins has been known for some time. U.S. Pat. No. 2,495,286 (Brubaker) discloses such polymers of relatively low carbon monoxide content in the presence of free radical initiators, e.g., peroxy compounds. G.B. 1,081,304 discloses similar polymers of higher carbon monoxide content in the presence of alkylphosphine complexes of palladium compounds as catalyst. U.S. Pat. No. 3,694,412 (Nozaki) extended the reaction to produce linear alternating polymers in the presence of arylphosphine complexes of palladium moieties and certain inert solvents.

More recently, the class of linear alternating polymers of carbon monoxide and at least one ethylenically unsaturated hydrocarbon, now becoming known as polyketones or polyketone polymers, has become of greater interest. U.S. Pat. No. 4,880,903 (VanBroekhoven et al.) discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal selected from palladium, cobalt or nickel, the anion of a strong non-hydrohalogenic acid and a bidentate ligand of phosphorus, arsenic or antimony. U.S. Pat. No. 4,843,144 (VanBroekhoven et al.) discloses a process for preparing polymers of carbon monoxide and at least one ethylenically unsaturated hydrocarbon using the preferred catalyst comprising a compound of palladium, the anion of a non-hydrohalogenic acid having a pKa of below about 6 and a bidentate ligand of phosphorus.

The resulting polymers are relatively high molecular weight materials having established utility as premium thermoplastics in the production of shaped articles, such as containers for food and drink and parts for the automotive industry, which are produced by processing the polyketone polymer according to well known methods.

SUMMARY OF THE INVENTION

The present invention provides certain stabilized polymeric compositions of linear alternating polymers of carbon monoxide and at least one ethylenically unsaturated hydrocarbon, and a process for the production of such stabilized compositions. The compositions are stabilized with a mixture of hydroxyapatite and an alumina hydrogel or aluminum-containing decomposition product thereof. The hydroxyapatite is of the formula $M_{10}(PO_4)_6(OH)_2$, where M is barium (Ba), strontium (Sr), or calcium (Ca). The alumina hydrogel is of the formula $Al_2O_3 \cdot nH_2O$, where $0 < n < 10$. More particularly, the invention provides compositions comprising the linear alternating polymer having a stabilizing mixture of calcium hydroxyapatite and bayerite incorporated therein. The resulting compositions demonstrate improved stability upon being subjected to melt processing conditions.

DESCRIPTION OF THE INVENTION

The stabilized polyketone polymers of the invention are of a linear alternating structure and contain substantially one molecule of carbon monoxide for each molecule of unsaturated hydrocarbon. Suitable ethylenically unsaturated hydrocarbons for use as precursors of the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

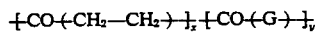

wherein G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the $-CO-(-CH_2-CH_2-)-$ units and the $-CO-(-G-)-$ units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,843,144 (Van Broekhoven et al.). The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atomosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

During melt processing, the neat polyketone polymer exhibits an undesirable viscosity increase. It is most desirable for a thermoplastic polymer to have little or no viscosity increase during processing. Most commercial-grade engineering thermoplastics exhibit little or no change in viscosity during melt processing because of the presence of an additive package selected to minimize such a change in properties. For example, U.S. Pat. No. 2,493,597 identifies organic esters of phosphorous acid as melt viscosity stabilizers for polyamides.

It is an object of this invention to stabilize the polyketone polymers so that they remain unchanged upon being subjected to conditions which would otherwise bring about a change in their properties. This object is realized by adding a stabilizing mixture to the polyketone polymer.

The stabilized compositions of the invention comprise an intimate mixture of the linear alternating polymer with a stabilizing mixture of a hydroxyapatite and an alumina hydrogel or aluminum-containing decomposition product thereof.

The hydroxyapatite component of the stabilizing mixture can be represented by the formula $M_{10}(PO_4)_6(OH)_2$, where M is barium (Ba), strontium (Sr), or calcium (Ca). The preferred hydroxyapatite is calcium hydroxyapatite, $Ca_{10}(PO_4)_6(OH)_2$, a naturally occurring calcium phosphate and the major constituent of bone and tooth mineral. It is a finely divided, crystalline, non-stoichiometric material rich in surface ions which are readily replaced by fluoride ions. Calcium hydroxyapatite is also referred to as tribasic calcium phosphate.

The second component of the stabilizing mixture is an alumina hydrogel or aluminum-containing decomposition product thereof. The precise form of the aluminum species present in the final composition will depend upon a number of factors including the degree of moisture in the polymer with which the alumina hydrogel is mixed, whether or not the composition has been exposed to moisture (as by contact with a humid environment), and the temperature at which and the number of times the composition has been thermally processed. It is known that the alumina hydrogel will lose moisture and form crystalline phases upon aging, such that the hydrogel is transformed, probably to species containing a mixture of aluminum hydrogel and aluminum oxide moieties. At elevated temperatures, thermal decomposition of the alumina hydrogel may occur, and is also considered to give species containing aluminum hydroxyl and oxide moieties. Since the aluminum species is much the same regardless of the type of transformation, the term "decomposition product" when used herein is employed to indicate the aluminum-containing species resulting from any type of alumina hydrogel transformation.

The alumina hydrogel employed in the invention can be represented by the formula $Al_2O_3 \cdot nH_2O$ where $0 < n < 10$. These hydrogels can be prepared by titrating an aqueous solution of one or more aluminum salt(s) with an appropriate acidic or basic material or solution to cause precipitation of the alumina gel. U.S. Pat. Nos. 3,124,418; 3,520,654; and 4,154,812 disclose processes for preparing pure alumina hydrogel and are incorporated herein by reference. U.S. Pat. No. 4,851,470 discloses mineral-filled polyketone polymers, and includes aluminum trihydrate as a suitable filler.

The alumina hydrogel can be prepared by titrating an acidic aluminum salt such as, aluminum sulfate, aluminum nitrate, or aluminum chloride, in aqueous solution with a basic precipitating medium, such as sodium hydroxide or ammonium hydroxide, or by titrating an alkali metal aluminate, for example sodium aluminate or potassium aluminate, in aqueous solution with an acidic precipitating medium, for example hydrochloric or nitric acid. Adjustment of the pH of an aluminum-containing solution to between about 5.5 and about 10.0 will result in precipitation of the aluminum as aluminum hydroxide and hydrated aluminum oxide.

The alumina hydrogels usable within the scope of the present invention include aluminum trihydroxides, such as gibbsite or hydrargillite ($\alpha$-alumina trihydrate, $\alpha$-$Al(OH)_3$ or $\alpha$-$Al_2O_3 \cdot 3H_2O$), bayerite ($\beta$-alumina trihydrate, $\beta$-$Al(OH)_3$ or $\beta$-$Al_2O_3 \cdot 3H_2O$) and nordstrandite (new $\beta$-$Al(OH)_3$). Also included within the class of "alumina hydrogel or decomposition product thereof" are the aluminum oxide hydroxides, including boehmite ($\alpha$-alumina monohydrate, $AlO(OH)$ or $\alpha$-$Al_2O_3 \cdot H_2O$) and diaspore ($\beta$-alumina monohydrate, $AlO(OH)$ or $\beta$-$Al_2O_3 \cdot H_2O$). Corundum, ($\alpha$-alumina, $Al_2O_3$) is also contemplated within the scope of the phrase "alumina hydrogel or decomposition product thereof."

Bayerite, gibbsite, boehmite, and/or mixtures thereof are preferred hydrogels for use herein, and bayerite is particularly preferred.

The mixture of hydroxyapatite and alumina hydrogel is employed in a stabilizing quantity. The specific amount of stabilizing mixture present in the compositions of the invention is not critical, as long as a stabilizing quantity is present and other important polymer properties for the intended use are not adversely affected. The precise amount required for melt stabilization will depend upon a variety of factors, such as the melt temperature, the polymer's LVN, and other additives interactive effects. The hydroxyapatite is provided in an amount from less than about 0.01 wt % to 5 wt % or more hydroxyapatite, based on the weight of polymer to be stabilized. Compositions containing from less than about 0.01 wt % to about 1.0 wt % hydroxyapatite, on the same basis, are believed to exhibit desirable melt stability, while compositions containing less than about 0.01 wt % to about 0.5 wt % hydroxyapatite are preferred for a wide variety of uses. The alumina hydrogel is provided in an amount of from about 0.01 wt % to about 10 wt %, based on the weight of polymer to be stabilized. Compositions containing from about 0.05 wt % to about 2 wt % alumina hydrogel on the same basis are preferred.

The hydroxyapatite and alumina hydrogel components of the stabilizing mixture are added to the polyketone polymer by any method suitable for forming an intimate mixture of the polymer and stabilizers. Such methods include dry blending of the polymer and stabilizers in a finely divided form, followed by hot pressing or extrusion of the mixture. The composition may also be produced by blending the components in a melt mixing device. The stabilizer components are preferably added to the polymer at the same time, but satisfactory results are obtained when the components are added separately.

The compositions of the invention may also include other additives such as antioxidants, dyes, fillers or reinforcing agents, fire resistant materials, mold release agents, colorants and other materials designed to improve the processability of the polymers or the properties of the resulting blend. Such additives are added prior to, together with, or subsequent to the blending of the polyketone and stabilizers. The presence of these additives may affect the optimum level of stabilizers for a given application.

The compositions are processed by methods such as extrusion and injection molding into sheets, films, plates and shaped parts. The compositions of the invention are particularly useful for the production of articles by multiple melting/crystallization cycles, and where elevated temperatures are likely to be encountered. Illustrative of such applications are the production of articles useful in both rigid and flexible packaging applications, such as containers and films, and in both internal and external parts for automotive use; fibers useful in yarns, tire cord, and fabric; and coatings for a variety of materials.

The invention is further illustrated by the following Examples which should not be regarded as limiting.

EXAMPLE 1

A linear alternating terpolymer of carbon monoxide, ethylene, and propylene (89/056) was produced in the presence of a catalyst composition formed from palladium acetate, trifluoroacetic acid and 1,3-bis[di(2-methoxyphenyl)phosphino]propane. The polyketone polymer had a melting point of about 220° C. and an LVN of about 1.08 dl/g when measured in m-cresol at 60° C. The polyketone polymer also contained 0.5% ETHANOX 330 and 0.5% Nucrel 535.

EXAMPLE 2

A portion of the polymer of Example 1 was ground to 60 mesh, and then powder-mixed with calcium hydroxyapatite (with a theoretical atomic ratio of 1.67 Ca/P) and/or bayerite, an alumina trihydrate (VERSAL B, available from Laroche) in a Henschel mixer for 5 minutes. Samples containing various concentrations of calcium hydroxyapatite and/or bayerite were prepared, as shown in Table 1. The samples were compounded in a ¾ inch Braebender single screw extruder, operating at 60 to 100 RPM with melt temperatures between 230° and 250° C. The viscosity of each sample was determined over time in the melt in a Rheometrics parallel plate rheometer operated at 275° C. Table 1 lists the initial melt viscosity and the viscosity after 10 and 28 minutes.

TABLE 1

| Calcium Hydroxyapatite (wt %) | Bayerite (wt %) | Viscosity (Pa.-sec.) | | |
|---|---|---|---|---|
| | | 0 min | 10 min | 28 min |
| 0 | 0 | 90 | 154 | 1398 |
| 0.5 | 0 | 90 | 90 | 284 |
| 1.0 | 0 | 90 | 90 | 245 |
| 5.0 | 0 | 90 | 90 | 225 |
| 1.0 | 0.5 | 90 | 90 | 214 |

Compared to the neat polyketone, the viscosity of each of the stabilized samples remained relatively constant for at least 10 minutes. After 28 minutes, the viscosity of the polyketone polymer significantly increased, while the viscosity of the stabilized samples was maintained at a much lower level. The combination of calcium hydroxyapatite with bayerite gave the best viscosity control.

EXAMPLE 3

A linear alternating terpolymer of carbon monoxide, ethylene, and propylene (89/048) was produced in the presence of a catalyst composition formed from palladium acetate, trifluoroacetic acid and 1,3-bis[di(2-methoxyphenyl)phosphino]propane. The polyketone polymer had a melting point of about 220° C. and an LVN of about 1.52 dl/g when measured in m-cresol at 60° C. The polyketone polymer also contained 0.2% ETHANOX 330 and 0.2% glycerol monostearate.

EXAMPLE 4

A portion of the polymer of Example 3 was ground to 60 mesh, and then powder-mixed with calcium hydroxyapatite (with a theoretical atomic ratio of 1.67 Ca/P) and/or bayerite, an alumina trihydrate (Versal B, available from Laroche) in a Henschel mixer for 5 minutes. Samples containing various concentrations of calcium hydroxyapatite and/or bayerite were prepared, as shown in Table 2. The samples were compounded in a ¾ inch Braebender single screw extruder, operating at 60 to 100 RPM with melt temperatures between 230° and 250° C. The viscosity of each sample was determined over time in the melt in a Rheometrics parallel plate rheometer operated at 275° C. Table 2 lists the initial melt viscosity and the viscosity after 10 and 28 minutes.

TABLE 2

| Calcium Hydroxyapatite (wt %) | Bayerite (wt %) | Viscosity (Pa.-sec.) | | |
|---|---|---|---|---|
| | | 0 min | 10 min | 28 min |
| 0 | 0 | 419 | 5248 | 30,140 |
| 0 | 0.05 | 419 | 4109 | 23,430 |
| 0 | 0.5 | 419 | 3145 | 18,030 |
| 0.1 | 0 | 419 | 3936 | 22,870 |
| 0.05 | 0.05 | 419 | 3293 | 16,970 |

The results indicate that both stabilizers maintained the viscosity of the samples at a significantly lower level than the polyketone polymer alone. The combination of 0.05 wt % calcium hydroxyapatite and 0.05 wt % bayerite provided viscosity control significantly better than 0.1 wt % calcium hydroxyapatite alone, and significantly better than 0.05 wt % bayerite alone, after 10 minutes. The combination was also more effective than 0.5 wt % bayerite after 28 minutes.

What is claimed is:

1. A stabilized polymer composition comprising:
a linear alternating polymer of carbon monoxide and at least one ethylenically unsaturated hydrocarbon wherein the polymer is of the repeating formula

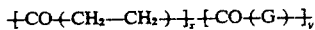

wherein G is a moiety of an ethylenically unsaturated hydrocarbon of at least 3 carbon atoms, polymerized through the ethylenic unsaturation, and the ratio of y:x is no more than about 0.5, and
a mixture of a hydroxyapatite and an alumina hydrogel, wherein the mixture is present in the composition in a stabilizing amount.

2. The composition of claim 1 wherein the hydroxyapatite is calcium hydroxyapatite or tribasic calcium phospate.

3. The composition of claim 2 wherein the alumina hydrogel is an aluminum trihydroxide.

4. The composition of claim 3 wherein y is 0.

5. The composition of claim 3 wherein the ratio of y:x is from 0.01 to about 0.1.

6. The composition of claim 3 wherein G is a moiety of propylene.

7. The composition of claim 3 wherein the calcium hydroxyapatite or tribasic calcium phosphate is present in a quantity of from about 0.01 wt % to about 5 wt %, based on total composition, and the aluminum trihydroxide is bayerite and is present in a quantity of from about 0.01 wt % to about 10 wt %, based on total composition.

8. A composition stabilized against a change in viscosity during melt processing which comprises a linear alternating polymer of carbon monoxide and at least one ethylenically unsaturated hydrocarbon wherein the polymer is of the repeating formula

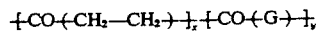

wherein G is a moiety of an ethylenically unsaturated hydrocarbon of at least 3 carbon atoms, polymerized through the ethylenic unsaturation, and the ratio of y:x is no more than about 0.5, having incorporated therein a stabilizing quantity of a mixture of hydroxyapatite and an alumina hydrogel.

9. The composition of claim 8 wherein the hydroxyapatite is calcium hydroxyapatite or tribasic calcium phosphate.

10. The composition of claim 9 wherein the alumina hydrogel is an aluminum trihydroxide.

11. The composition of claim 10 wherein y is 0.

12. The composition of claim 10 wherein the ratio of y:x is from 0.01 to about 0.1.

13. The composition of claim 10 wherein G is a moiety of propylene.

14. The composition of claim 9 wherein the calcium hydroxyapatite or tribasic calcium phosphate is present in a quantity of from about 0.01 wt % to about 5 wt %, based on total composition, and the aluminum trihydroxide is bayerite and is present in a quantity of from about 0.01 wt % to about 10 wt %, based on total composition.

15. A method of stabilizing a linear alternating polymer of carbon monoxide and at least one ethylenically unsaturated hydrocarbon against a change in viscosity during melt processing by incorporating therein a stabilizing mixture of a hydroxyapatite and an aluminum hydrogel.

16. The method of claim 15 wherein the polymer is of the repeating formula

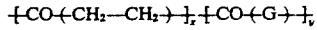

wherein G is a moiety of an ethylenically unsaturated hydrocarbon of at least 3 carbon atoms polymerized through the ethylenic unsaturation, and the ratio of y:x is no more than about 0.5.

17. The method of claim 16 wherein the hydroxapatite is calcium hydroxyapatite or tribasic calcium phosphate.

18. The method of claim 17 wherein y is 0.

19. The method of claim 17 wherein the ratio of y:x is from 0.01 to about 0.1.

20. The method of claim 17 wherein G is a moiety of propylene.

* * * * *